(12) United States Patent
Siomina et al.

(10) Patent No.: US 8,983,452 B2
(45) Date of Patent: Mar. 17, 2015

(54) METHODS AND ARRANGEMENTS FOR MAINTAINING TIMING CHARACTERISTICS

(75) Inventors: Lana Siomina, Solna (SE); Yang Zhang, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 419 days.

(21) Appl. No.: 12/963,023

(22) Filed: Dec. 8, 2010

(65) Prior Publication Data
US 2011/0207450 A1 Aug. 25, 2011

Related U.S. Application Data

(63) Continuation-in-part of application No. PCT/CN2010/000217, filed on Feb. 19, 2010.

(51) Int. Cl.
*H04W 88/02* (2009.01)
*G01S 5/02* (2010.01)
*G01S 5/10* (2006.01)

(52) U.S. Cl.
CPC .............. *G01S 5/021* (2013.01); *G01S 5/0221* (2013.01); *G01S 5/10* (2013.01)
USPC ............. 455/422.1; 455/561; 455/456.1; 455/456.2; 455/456.3; 455/502; 370/503; 370/350; 370/324; 370/252; 370/410

(58) Field of Classification Search
CPC .................................................. H04W 88/02
USPC ......... 455/422.1, 456.1–456.5; 370/252, 324, 370/350, 503, 410
See application file for complete search history.

(56) References Cited

U.S. PATENT DOCUMENTS

| | | | |
|---|---|---|---|
| 5,969,679 A | 10/1999 | Bolliger et al. | |
| 7,710,944 B1 * | 5/2010 | Yoon | 370/350 |
| 7,813,311 B2 * | 10/2010 | Dick et al. | 370/324 |
| 2004/0002828 A1 | 1/2004 | Swope et al. | |
| 2004/0027281 A1 | 2/2004 | Akopian et al. | |

(Continued)

FOREIGN PATENT DOCUMENTS

| | | |
|---|---|---|
| CN | 1241889 A | 1/2000 |
| CN | 1434305 A | 8/2003 |

(Continued)

OTHER PUBLICATIONS

International Search Report and the Written Opinion of the International Searching Authority Corresponding to International Application No. PCT/CN2010/001983; Date of Mailing: Mar. 10, 2011; 11 pages.

(Continued)

*Primary Examiner* — Michael T Vu
(74) *Attorney, Agent, or Firm* — Myers Bigel Sibley & Sajovec, P.A.

(57) ABSTRACT

A coordinating node, such as a positioning node and a radio base station, and a related method of maintaining timing characteristics of radio base stations connected to the coordinating node are disclosed. The method includes receiving timing information from a plurality of radio base stations, determining a respective timing characteristic of each of the plurality of radio base stations based on the received timing information, and maintaining the determined respective timing characteristics for support of network operations and services such as positioning.

17 Claims, 13 Drawing Sheets

(56) References Cited

U.S. PATENT DOCUMENTS

| | | | |
|---|---|---|---|
| 2004/0087269 | A1 | 5/2004 | Edge et al. |
| 2007/0013584 | A1 | 1/2007 | Camp, Jr. |
| 2007/0179793 | A1 | 8/2007 | Bagchi et al. |
| 2009/0131073 | A1 | 5/2009 | Carlson et al. |
| 2009/0131075 | A1* | 5/2009 | Mazlum et al. ............ 455/456.1 |
| 2009/0179793 | A1 | 7/2009 | Remondi |
| 2010/0323723 | A1 | 12/2010 | Gerstenberger et al. |

FOREIGN PATENT DOCUMENTS

| | | |
|---|---|---|
| CN | 1628423 A | 6/2005 |
| CN | 101472330 A | 7/2009 |
| EP | 1 229 756 A2 | 8/2002 |
| GB | 2 333 664 A | 7/1999 |
| WO | WO 01/80461 A1 | 10/2001 |
| WO | WO 02/071095 A2 | 9/2002 |
| WO | WO 2004/109324 A1 | 12/2004 |
| WO | WO 2005/025249 A1 | 3/2005 |
| WO | WO 2005/055471 A1 | 6/2005 |

OTHER PUBLICATIONS

International Search Report and the Written Opinion of the International Searching Authority corresponding to International Application No. PCT/CN2010/001984; Date of Mailing: Mar. 17, 2011; 14 Pages.

International Search Report and the Written Opinion of the International Searching Authority corresponding to International Application No. PCT/CN2010/000217; Date of Mailing: Nov. 25, 2010; 9 pages.

First Office Action, including Search Report, Corresponding to Chinese Patent Application No. 201080064151.3; Date of Mailing: Jun. 4, 2014; 12 pages.

Extended European Search Report, corresponding to EP Application 10845987.6, dated Jul. 1, 2014, 5 pages.

Extended European Search Report, corresponding to EP Application 10845986.8, dated Jul. 1, 2014, 6 pages.

3GPP TS 36.214 V9.2.0, $3^{rd}$ Generation Partnership Project; Technical Specification Group Radio Access Network; Evolved Universal Terrestrial Radio Access (E-UTRA); Physical Measurements (Release 9), Jun. 2010, 14 pages.

3GPP TSG RAN WG4 meeting #AH01, "Remaining issues on assistance data for OTDOA positioning—window size," Jan. 18-22, 2010, 3 pages.

3GPP TS 36.355 V9.3,0, $3^{rd}$ Generation Partnership Project; Technical Specification Group Radio Access Network; Evolved Universal Terrestrial Radio Access (E-UTRA) LTE Positioning Protocol (LPP) (Release 9) Sep. 2010, 113 Pages.

First Office Action, including Search Report, corresponding to Chinese Patent Application No. 201080064256.9, Date of Mailing: Sep. 17, 2014; 12 Pages.

* cited by examiner

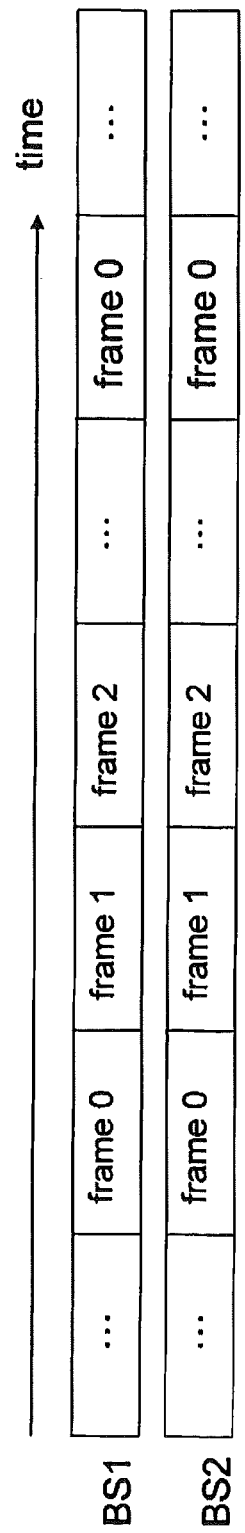
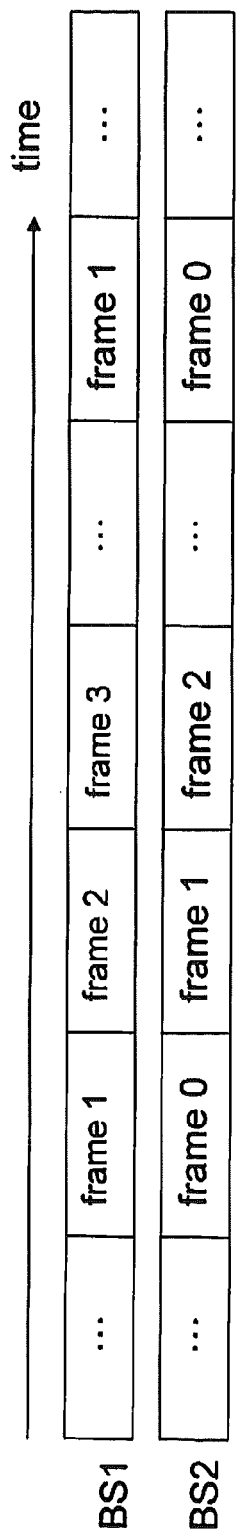

METHODS AND ARRANGEMENTS FOR MAINTAINING TIMING CHARACTERISTICS

CROSS REFERENCE TO RELATED APPLICATIONS

The present application is a continuation-in-part of and claims priority from PCT International Application No. PCT/CN2010/000217, filed on 19 Feb. 2010, the disclosure of which is incorporated by reference herein in its entirety. This application is related to commonly assigned U.S. application Ser. No. 12/963,077, entitled "METHOD AND ARRANGEMENT FOR DETERMINING TIMING UNCERTAINTY", filed concurrently herewith.

TECHNICAL FIELD

The present invention relates to radio base station timing characteristics, and more particularly to a coordinating node and a radio base station, and methods of maintaining timing characteristics for radio base stations connected to the coordinating node.

BACKGROUND

The Universal Mobile Telecommunication System (UMTS) is one of the third generation mobile communication technologies designed to succeed GSM. 3GPP Long Term Evolution (LTE) is a project within the 3rd Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a user equipment (UE) 150 is wirelessly connected to a radio base station (RBS) 110a commonly referred to as an evolved NodeB (eNodeB), as illustrated in FIG. 1. Each eNodeB 110a-c serves one or more areas referred to as cells 120a-c. Furthermore, each eNodeB is connected to an Operations Support System (OSS) 130 for operation and maintenance purposes. The interface between an eNodeBs and the OSS is at least partly proprietary. In FIG. 1, a link between two nodes, such as the link between a positioning node here called Evolved Serving Mobile Location Center (E-SMLC) 100 and an eNodeB 110a,b,c, may be either a logical link e.g. via higher-layer protocols and/or via other nodes, or a direct link. Hereinafter, a UE in a positioning architecture is a general term covering a positioning target which may e.g. be a mobile device, a laptop, a small radio node or base station, a relay, or a sensor. A radio base station is a general term for a radio network node capable of transmitting radio signals. A radio base station may e.g. be a macro base station, a micro base station, a home eNodeB, a beaconing device, or a relay.

UE positioning is a process of determining UE coordinates in space. Once the coordinates are available, they may be mapped to a certain place or location. The mapping function and delivery of the location information on request are parts of a location service which is required for basic emergency services. Services that further exploit a location knowledge or that are based on the location knowledge to offer customers some added value are referred to as location-aware and location-based services. The possibility of identifying a UE's geographical location has enabled a large variety of commercial and non-commercial services such as navigation assistance, social networking, location-aware advertising, and emergency calls. Different services may have different positioning accuracy requirements imposed by an application. Furthermore, requirements on the positioning accuracy for basic emergency services defined by regulatory bodies exist in some countries. An example of such a regulatory body is the Federal Communications Commission (FCC) regulating the area of telecommunications in the United States.

There exist a variety of positioning techniques in wireless communications networks, differing in their accuracy, implementation cost, complexity, and applicability in different environments. Positioning methods may be broadly categorized into satellite based and terrestrial methods. Global Navigation Satellite System (GNSS) is a standard generic term for satellite navigation systems that enable UEs to locate their position and acquire other relevant navigational information. The Global Positioning System (GPS) and the European Galileo positioning system are well known examples of GNSS. In many environments, the position may be accurately estimated by using positioning methods based on GPS. Nowadays wireless networks also often have a capability to assist UEs in order to improve an UE receiver sensitivity and a GPS start up performance, as for example in the Assisted-GPS (A-GPS) positioning method. However, GPS or A-GPS receivers are not necessarily available in all wireless UEs, and some wireless communications systems do not support A-GPS. Furthermore, GPS-based positioning may often have unsatisfactory performance in urban and/or indoor environments. There may therefore be a need for a complementary terrestrial positioning method.

There are a number of different terrestrial positioning methods. Some examples are:

Cell Identity (CID) based positioning, where the location is based on the I identity of the current cell. Enhanced CID (E-CID) also takes e.g. Timing Advance (TA) into account to improve the positioning accuracy which may be important for positioning in large cells.

UE-based and UE-assisted Observed Time Difference Of Arrival (OTDOA), where the UE position is determined based on UE measurements of reference signals from three or more sites or locations.

Network based Uplink Time Difference Of Arrival (U-TDOA) positioning, where the UE position is determined based on several RBS measurements of a reference signal transmitted by the UE. Multi-lateration is then used to find a UE position as the intersection of hyperbolas when based on time difference measurements, or of circles when based on time of arrival measurements.

Fingerprinting or pattern matching positioning, where location fingerprints are collected in an off-line phase and are used for mapping measured signal strengths with a position. Location fingerprints are e.g. vectors of signal strength values of reference signals received from different RBSs in a position. Adaptive E-CID (AECID) is a fingerprinting positioning method that combines geographical cell descriptions corresponding to CIDs, received signal strengths and TA. AECID may also be extended to include Angle of Arrival (AoA) information. Whenever an A-GPS, A-GNSS or OTDOA high precision positioning is performed, the E-SMLC orders measurements of the radio properties which is a subset of geographical cell descriptions, TA, signal strengths and AoA. The radio property measurements are quantized and produce the fingerprint of the obtained high precision position.

Positioning methods based on time difference of arrival (TDOA) measurements have been widely used, for example in GSM, UMTS and cdma2000. For LTE networks, UE-assisted OTDOA positioning which is based on downlink TDOA measurements is currently being standardized. A corresponding UE-based mode is another possible candidate for later releases. The UE-assisted and UE-based modes differ in where the actual position calculation is carried out.

In the UE-assisted mode, the UE measures the TDOA of several cells and sends the measurement results to the network. A positioning node or a location server in the network carries out a position calculation based on the measurement results. In LTE, the positioning node in the control plane is referred to as an E-SMLC. The E-SMLC 100 is either a separate network node, as illustrated in FIG. 1, or a functionality integrated in some other network node. In the UE-based mode, the UE makes the measurements and also carries out the position calculation. The UE thus requires additional information for the position calculation, such as a position of the measured RBSs and a timing relation between the RBSs. In the user plane, the location or positioning node is referred to as Secure User Plane Location (SUPL) Location Platform (SLP).

The OTDOA positioning has won good acceptance among operators and vendors for LTE positioning. Some operators have already started to plan for an OTDOA deployment in the LTE system. Moreover, the OTDOA related protocol in E-UTRAN has been adopted by the Open Mobile Alliance for user plane positioning. OTDOA is already standardized by 3GPP for GSM/EDGE RAN and UTRAN, but is not yet deployed in operational networks.

The OTDOA positioning is a multi-lateration technique measuring TDOA of reference signals received from three or more sites. To enable positioning, the UE should thus be able to detect positioning reference signals from at least three geographically dispersed RBS with a suitable geometry, as the UE's position may be determined by the intersection of at least two hyperbolas. This implies that the reference signals need to be strong enough or to have high enough signal-to-interference ratio in order for the UE to be able to detect them. With the OTDOA technique, the UE's position may be figured out based on the following measured parameters:

TDOA measurements of downlink reference signals;

Actual Relative Time Difference (RTD) between the RBS transmissions at the time when TDOA measurements are made; and Geographical position of the RBS whose reference signals are measured.

With more or longer TDOA measurements for each RBS a better accuracy may be obtained. Measuring TDOA for signals from more than three RBSs typically also improves the positioning accuracy, although additional inaccurate measurements may also degrade the final accuracy. The accuracy of each of the measurements thus contributes to the overall accuracy of the position estimate.

There are several approaches to how to determine the RTD. One is to synchronize transmissions of the RBSs, as is generally done in a system using Time Division Duplex. In this case, RTD is a known constant value that may be entered in a database and used when calculating a position estimate. The synchronization must be done to a level of accuracy of the order of tens of nanoseconds in order to get an accurate position estimate. Ten nanoseconds uncertainty corresponds to three meters of error in the position estimate. Drift and jitter in the synchronization timing must also be well-controlled as they also contribute to the uncertainty in the position estimate. Synchronization to this level of accuracy is currently available through satellite based time-transfer techniques. Another alternative is to leave the RBSs to run freely without synchronization but with some constraint on the maximum frequency error. In this scenario, the RTD will change with time. The rate of change will depend on the frequency difference and jitter between RBSs.

LTE Positioning Protocol (LPP) and LTE Positioning Protocol annex (LPPa) are protocols useful for carrying out OTDOA in a control plane solution in LTE. When receiving a positioning request for the OTDOA method, the E-SMLC requests OTDOA-related parameters from eNodeB via LPPa. The E-SMLC then assembles and sends assistance data and the request for the positioning to the UE via LPP. FIGS. 2a-d illustrate example architectures and protocol solutions of a positioning system in an LTE network. In the control plane solution, illustrated in FIG. 2a, the UE communicates with the E-SMLC transparently via the eNodeB and the Mobility Management Entity (MME) over LPP, and the eNodeB communicates with the E-SMLC transparently via the MME over LPPa. The user plane solution illustrated in FIG. 2b does not rely on the LPPa protocol, although 3GPP allows for the possibility of inter-working between the control and user plane positioning architectures. The SLP is the positioning node for user-plane positioning, similar to E-SMLC for control plane positioning, and there may or may not be an interface between the two positioning servers.

Since signals from multiple distinct sites need to be measured for OTDOA positioning, the UE receiver may have to deal with signals that are much weaker than those received from a serving cell. Furthermore, without an approximate knowledge of when the measured signals are expected to arrive in time and what is the exact pattern of a positioning reference signal, the UE would need to do signal search blindly within a large search window which would impact the accuracy of the measurements, the time it takes to perform the measurements, as well as the UE complexity. Therefore, to facilitate UE positioning measurements, the wireless network transmits assistance data to the UE. The assistance data and its quality are important for both the UE-based and the UE-assisted mode, although assistance data contents may differ for the two modes. The standardized assistance data includes among others a neighbor cell list with physical cell identities, a number of consecutive downlink sub frames used for the reference signals, an expected timing difference, and a search window. The expected timing difference and the search window, together referred to as search parameters, are important for an efficient reference signal correlation peak search.

Assisted GNSS (A-GNSS) is an important positioning technology, which is an extension to the existing A-GPS positioning standardized in 3GPP. Assistance data for positioning technologies such as A-GNSS or OTDOA, relying on assistance data, is useful for achieving a desired positioning accuracy. At the same time, building up assistance data requires efforts in the network, and information and information exchange between network nodes. Furthermore, the assistance data for different technologies is typically different. However, some of the information intended for the assistance data with one technology may be useful for another positioning technology or other-purpose network functions such as Radio Resource Management (RRM) and self-optimization.

The basic assistance data information elements for A-GNSS in LPP were mainly borrowed from the latest release of the Radio Resource Location Protocol (RRLP), which is the protocol used for location signaling in GSM and UMTS. Some data structure and format changes were made to make the assistance data information elements simpler and more future-proof. Besides the legacy A-GNSS assistance data, some new assistance data fields have been added, namely, the bsAlign indicator and the GNSSsynch indicator. The two fields are defined under the GNSS assistance data component. However, the standard is not clear on how a positioning node such as the E-SMLC may obtain this information.

SUMMARY

Some embodiments facilitate maintenance of RBS timing characteristics. The maintained timing characteristics may be used in assistance data for positioning of a wireless UE and for support of other network operations and services.

In accordance with some embodiments, a method is provided of maintaining timing characteristics of radio base stations connected to a coordinating node of a wireless communication system. The method includes receiving timing information from a plurality of radio base stations, and determining a respective timing characteristic of each of the plurality of radio base stations based on the received timing information. The method further includes maintaining the determined respective timing characteristics for support of network operations and services.

In accordance with further embodiment, a method is provided of enabling maintenance of radio base station timing characteristics in a coordinating node connected to a radio base station of a wireless communication system. The method includes transmitting timing information to the coordinating node, in order for the coordinating node to maintain a timing characteristic determined based on the timing information.

In accordance with further embodiments, a coordinating node configured to be used in a wireless communication system and to maintain timing characteristics of radio base stations connectable to the coordinating node is provided. The coordinating node includes a receiver circuit configured to receive timing information from a plurality of, radio base stations, and a determining circuit configured to determine a respective timing characteristic of each of the plurality of radio base stations based on the received timing information. The coordinating node also includes a maintaining circuit configured to maintain the determined respective timing characteristics for support of network operations and services.

In accordance with further embodiments, a radio base station configured to be used in a wireless communication system and to enable maintenance of radio base station timing characteristics in a coordinating node connectable to the radio base station is provided. The radio base station includes a transmitter circuit configured to transmit timing information to the coordinating node, in order for the coordinating node to maintain a timing characteristic determined based on the timing information.

In some embodiments, network operations and services, such as positioning, tracking area update, mobility and handover, and network optimization e.g. by means of improved interference coordination, may be facilitated and improved by dynamically maintaining RBS timing characteristics in a controlling node.

BRIEF DESCRIPTION OF THE DRAWINGS

FIGS. 3a-d are schematic block diagrams illustrating synchronization status for neighbor eNodeBs.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of methods and nodes, they may also be embodied in a computer program product as well as in a system including a computer processor and a memory coupled to the processor, wherein the memory is encoded with one or more programs that may perform the method steps disclosed herein.

Embodiments are described herein by way of reference to particular example scenarios. Particular aspects are described in a non-limiting general context in relation to positioning in an LTE system. It should though be noted that the embodiments may also be applied to other types of radio access networks such as evolved LTE, UMTS, cdma2000, and WiFi, as well as multi radio access technology systems. Moreover, the presented embodiments may be applied both for UE-based and UE-assisted modes for positioning, and to both control plane and user plane positioning.

Figure 1:
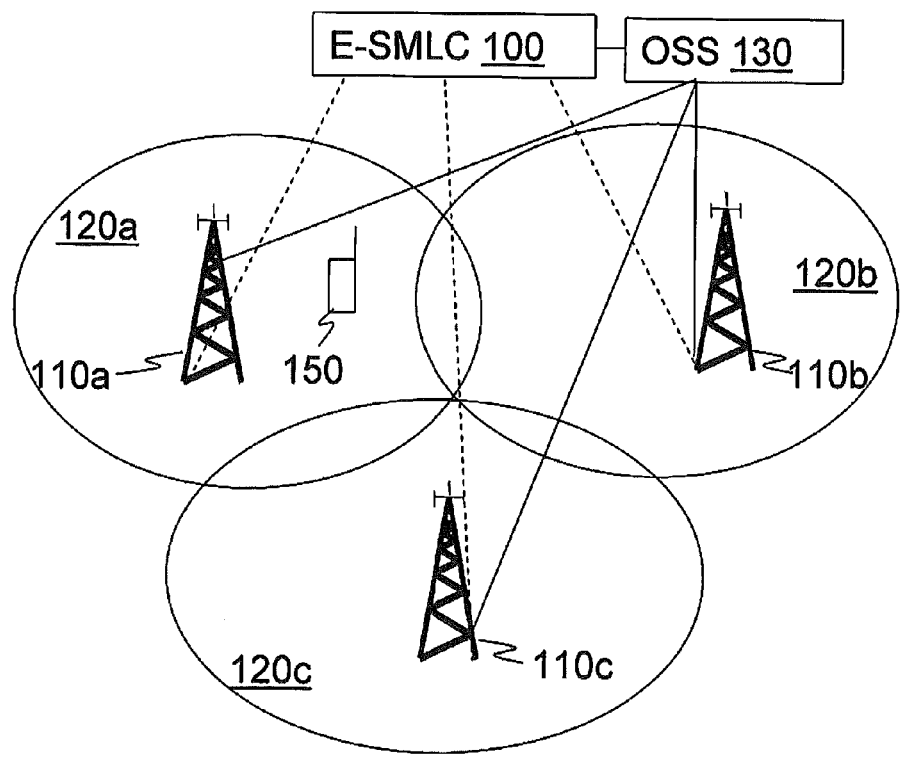
FIG. 1 is a schematic block diagram illustrating a conventional wireless communication system.
Figure 2A:
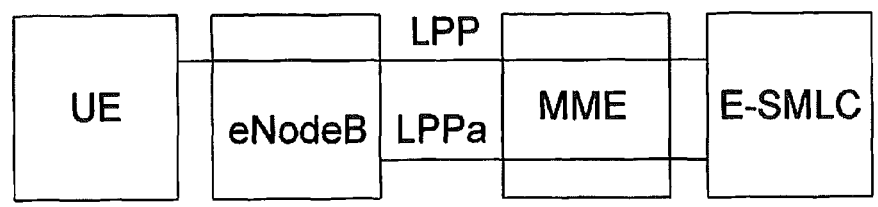
FIGS. 2a-d are schematic block diagrams illustrating positioning related entities and protocols in LTE.
Figure 2B:
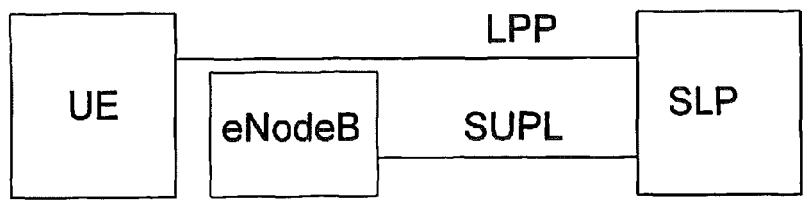
Figure 2C:
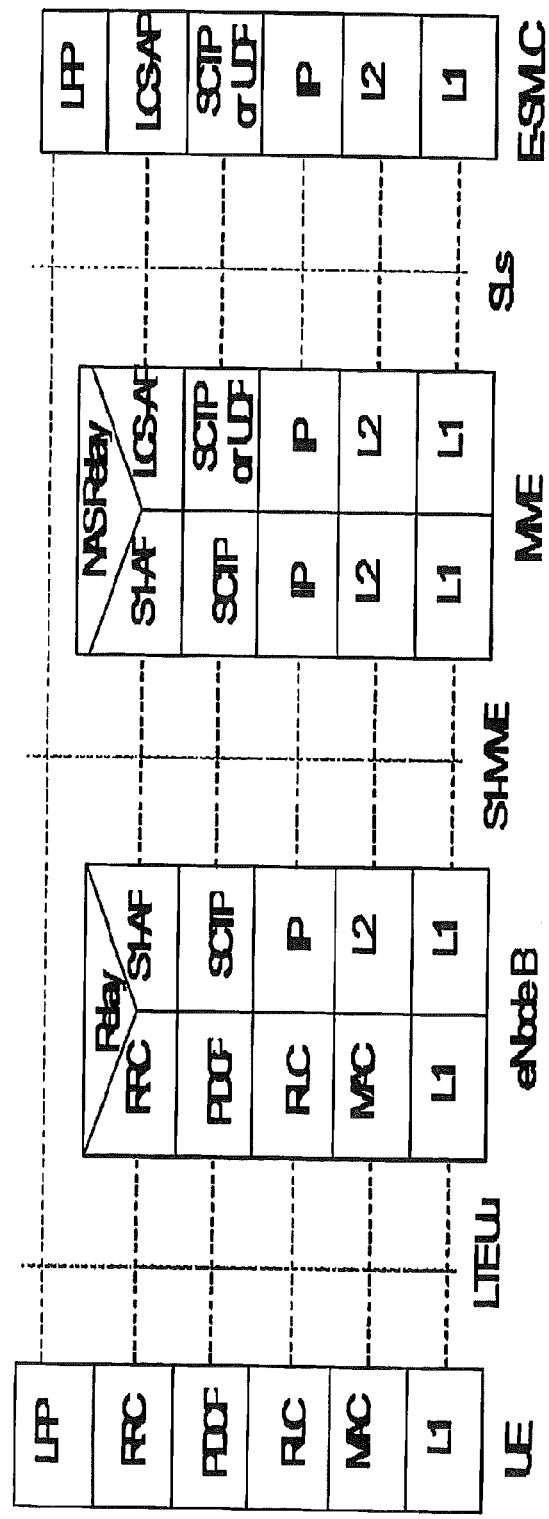
Figure 2D:
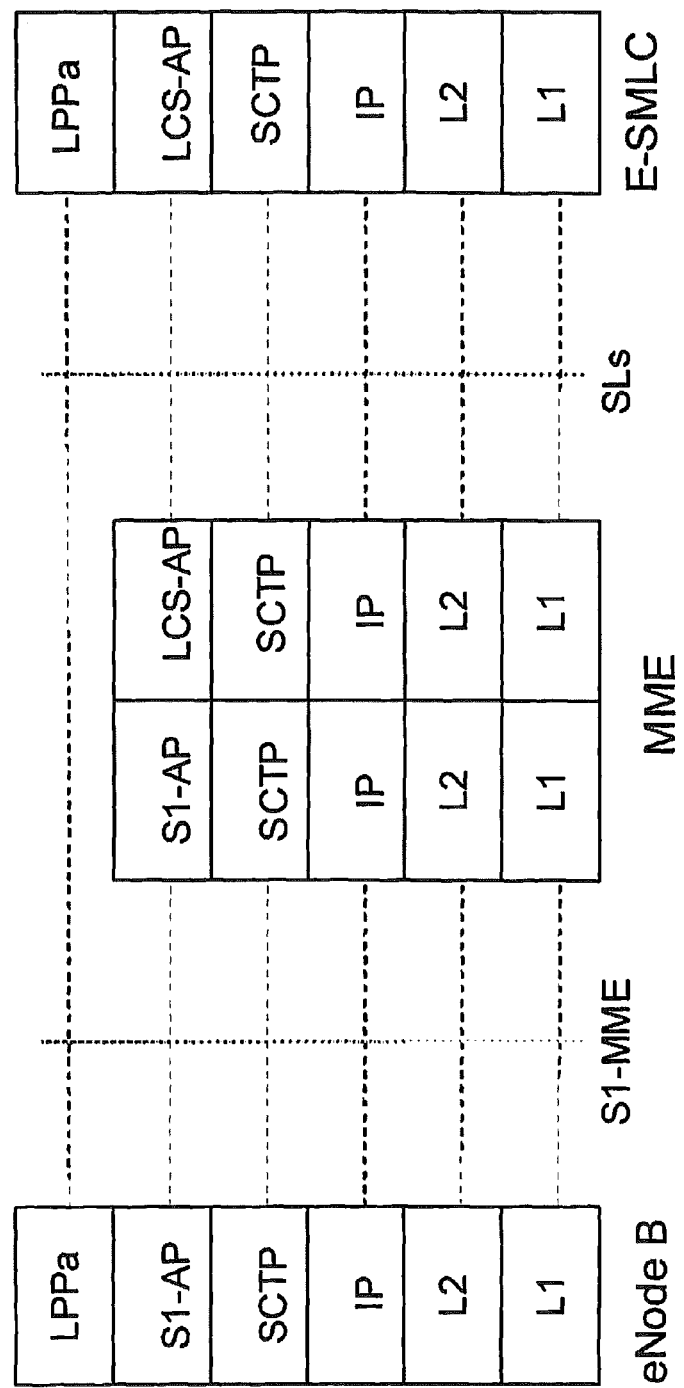
Figure 3C:
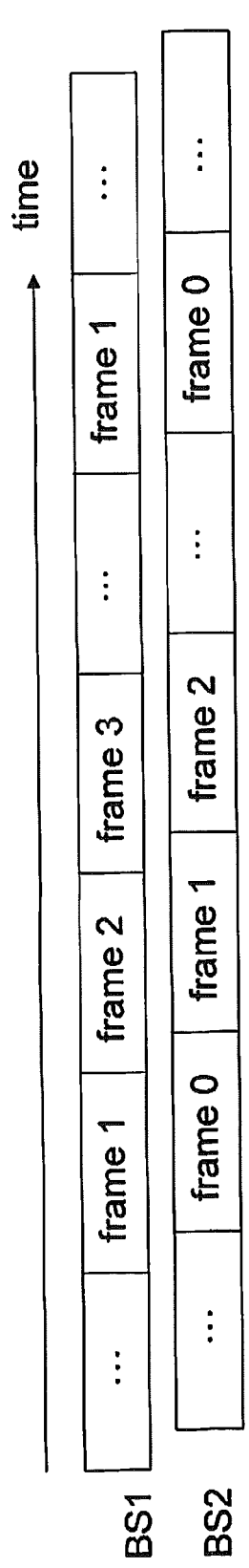

FIGS. 3a-d illustrate synchronization status of eNodeBs according to some typical synchronization situations in a wireless network. The timing relation of frame transmissions of two neighbour eNodeBs, BS1 and BS2, is illustrated. BS1 may e.g. be a reference cell and BS2 a neighbour to the reference cell. In FIG. 3a the two eNodeBs are fully synchronized. BS1 and BS2 transmit their respective frame 0 simultaneously, and are thus not only frame aligned, but also System Frame Number (SFN) aligned, which occurs among all cells in a fully synchronized network. Frame alignment means that the frame boundaries are transmitted at the same time from each eNodeB. The cells are SFN aligned if the frame boundaries of frames with a same frame number are transmitted at the same time from each eNodeB.

In FIG. 3a, the following is valid:

$$\Delta T = T_{BS2} - T_{BS1} = e(t) \qquad [1]$$

where the residual error e(t) is in the order of nanoseconds if a GPS/GNSS receiver is used for the synchronization of the eNodeB clocks. The residual error e(t) typically changes over time.

It is understood that an eNodeB may have more than one cell, and the eNodeB clock may or may not be common for all cells that the eNodeB is in charge of, although in the example in FIG. 3a it is. In FIG. 3b, BS1 and BS2 are not SFN aligned as BS2 transmits frame 0 when BS1 transmits frame 1 and they are thus not synchronized, although they are still frame aligned. The transmissions in cells may be frame-shifted on purpose, e.g. to avoid collisions of some periodic transmissions such as system information transmitted in the same subframe of every even frame. Even though the network is called asynchronous, time synchronization of each cell to a reference time is performed. Although the offsets are defined per eNodeB in this example, it is understood that the offsets may also be defined per cell.

In FIG. 3c, the eNodeBs are synchronized, although there is a non-zero mean timing offset that is known. BS1 and BS2 are thus not frame aligned, but there is still a non-zero offset between eNodeBs that is known. The offset may be one subframe in LTE, e.g. when cells are subframe-shifted to avoid collisions of synchronization signals transmitted in subframes 0 and 5 in each frame. To maintain the intended offset the cells still have to be synchronized to a certain reference time, e.g. the time drift is controlled for these cells and is typically not allowed to exceed a certain, typically quite small, level which may be in the order of a synchronization error e.g. nanoseconds. For the examples in FIGS. 3b and 3c, the following equation is applicable:

$$\Delta T = T_{BS2} - T_{BS1} = \text{offset} + e(t) \quad [2]$$

where offset corresponds to the constant timing offset between BS1 and BS2.

Figure 3D:
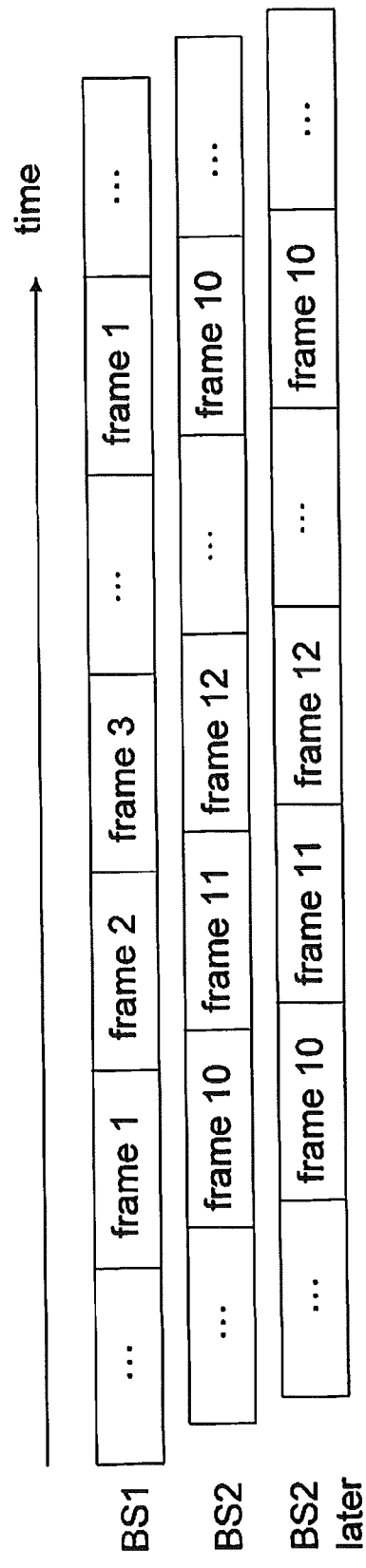

In FIG. 3d, the eNodeBs are not synchronized, and a time drift is present and not under control so that the offset between the eNodeBs varies with time. The following equation is applicable in this case:

$$\Delta T = T_{BS2} - T_{BS1} = \text{offset}(t) \quad [3]$$

This is illustrated in the figure by showing the frame timing of BS2 at two different points in time, which shows how the timing of BS2 drifts in time. This may e.g. be the case when both or either of the two eNodeBs or cells are using free-running clocks as a time source, e.g. without synchronizing to a reference time. If the clock stability of BS1 is 0.01 ppm and the clock stability of BS2 is −0.02 ppm, the relative timing relation is given by:

$$\text{offset}(t) = \text{offset\_init} + 0.03 \times 10^{-6} \times t + v(t) \quad [4]$$

where offset_init is the initial offset at the first observation, and v(t) is the error due to model mismatch and random interference. v(t) is generally referred to as the error variance. A more general model is given by:

$$\text{offset}(t) = \text{offset\_init} + DR1 \times t + 1/2 DR2 \times t^2 + v(t) \quad 2[5]$$

offset(t) changes over time, and DR1 and DR2 are the first and second order relative drift rates respectively. This model may of course be extended to cover higher order terms as well. Equations [1] and [2] above valid for a synchronized network, are just special cases of equation [5] which covers the non-synchronized network as well. Timing offset and drift rates, as well as error variances are hereinafter referred to as timing characteristics of the eNodeBs.

The Abstract Syntax Notation One (ASN.1) is a standard notation for describing data structures independent of machine-specific encoding techniques. The ASN.1 definition of a GNSS-ReferenceTime information element in the GNSS assistance data component includes the bsAlign field with the following notation:

bsAlign ENUMERATED {true} OPTIONAL

A NetworkTime appears in the ASN.1 definition of the GNSS-ReferenceTime information element and may be viewed as a virtual reference time. In a synchronous network all cells are synchronized with each other and with this NetworkTime. If the clocks of all cells are drifting at the same rate with a same starting point, i.e. the NetworkTime, the cells may still be synchronized with each other although not synchronized to the NetworkTime any more. Also a gnss-SystemTime appears in the ASN.1 definition. The NetworkTime is synchronized to the gnss-SystemTime in a fully synchronized network.

The bsAlign indicator indicates that the transmission timings of two eNodeBs or of two cells are frame aligned. The UE may thus derive the GNSS time relation for any of these RBSs or cells based on timing relation information provided in the GNSS-ReferenceTime information element. The bsAlign indicator is set consistently in all the RBSs or cells that are frame aligned. It should be noted that the bsAlign indicator does not guarantee SFN alignment.

The drift rate of the time relation between the gnss-SystemTime and the NetworkTime was previously optionally indicated by a frameDrift parameter in the NetworkTime information element. However, it has been suggested in standardization that it would be beneficial to always include the frameDrift parameter and set it to zero when the NetworkTime and the gnss-SystemTime are synchronized. If the NetworkTime and the gnss-SystemTime are not synchronized, the parameter may be optionally included and set to a non-zero value as initially specified, thus making the frameDrift field conditional. The frameDrift parameter is thus optionally included depending on the condition described by the GNSS synch indicator. With this condition, the field is present and set to 0 if NetworkTime is synchronized to gnss-SystemTime; otherwise the field is optionally present. It is however not totally clear in the standardization yet what the criterion is for setting the frameDrift parameter to zero, i.e. to indicate GNSSsynch, nor how to decide GNSSsynch.

As already stated in the background paragraph, there is no available description on how the positioning server may build up the bsAlign and GNSSsynch indicators which are needed for A-GNSS assistance data. This problem is addressed in embodiments of the invention.

Furthermore, the quality of the search parameters, such as the estimated RSTD and the search window, also depend on how well sub frames of the two cells involved in the search are time-aligned. In a perfectly synchronized ideal network, the timing offset between the cells is zero. In operational networks, the time offset is very likely to be non-zero even in case of a synchronized network due to a timing uncertainty resulting in synchronization errors and time drift. An estimation of a timing offset and a drift rate could be used to improve the search parameters. Since normally co-sited cells are identical in terms of timing characteristics as they have a common clock in the eNodeB, the timing relations of closely deployed eNodeBs are of interest.

This disclosure relates to the maintenance of timing characteristics of eNodeBs in a coordinating node of a wireless communication system. Each eNodeB transmits timing information to the coordinating node, either absolute timing information or timing information related to a timing reference. The coordinating node receives the timing information from all eNodeBs and determines timing characteristics for the eNodeBs based on the received timing information. The determined timing characteristics are then maintained by the coordinating node, i.e. the timing characteristics are stored and then kept updated in a database. The database may either be internal or external to the coordinating node. The determined and maintained timing characteristics may be one or more of an offset, a drift rate and an error variance, according to embodiments of the invention.

The coordinating node may in one embodiment be a master eNodeB responsible for several other eNodeBs, such as a macro base station responsible for pico base stations and/or relays in its area. Alternatively it may be a positioning node in the control plane and/or user plane, an OSS node, or another network node.

The following are different elements of embodiments, where each element may be considered as a standalone solution or may be used in any combinations with one or more of the other listed elements:

Obtaining and maintaining the bsAlign indicator;
Obtaining and maintaining GNSSsynch indicator;
Obtaining and dynamically maintaining the information about eNodeB timing relations and the uncertainty of eNodeB timing relations;
Using the indicators and/or timing relation information for building up assistance data for UE-assisted positioning such as OTDOA positioning and for enhancing UE measurements for UE-based positioning such as GNSS, OTDOA or Uplink Time Difference Of Arrival (UTDOA) positioning; and
Using the indicators and/or timing relation information for enhancing e.g. general operation and maintenance, network optimization, tracking area update, interference coordination, and/or mobility and handover.

The purpose is thus to let the eNodeBs report timing information to the coordinating node in order to allow the coordinating node to determine timing characteristics of the eNodeBs, e.g. based on an estimation. The coordinating node will maintain the determined timing characteristics, which may be used for network operations and services such as positioning. The advantages are that the load on the interfaces between the eNodeBs and the E-SMLC will be reduced, as the E-SMLC must not request and receive timing information from the eNodeB every time a UE positioning is requested. Furthermore, the timing characteristics may be used to determine the bsAlign and the GNSSsynch indicators, which may also be maintained. The maintained indicators may e.g. be used by the network when buliding up the OTDOA assistance data, not only the A-GNSS assistance data. Knowledge of what cells that are fast drifting may be used for a black listing of cells for OTDOA positioning, or for setting them as second priority cells for UE positioning measurements. For UTDOA, cooperating Location Measurement Units (LMUs) may also be selected based on the available time drift information.

The maintained timing characteristics and indicators may also be used for other network operations and services than positioning, e.g. as a basis for sending alarms to the OSS or to be used together with or in relation to a minimizing driving test feature. The timing information, possible requests for the timing information, and/or results of its processing may be transmitted over the interfaces between the corresponding nodes, e.g. over LPPa for communication between eNodeB and E-SMLC, over a proprietary interface between E-SMLC and SLP, over a proprietary or standardized interface between eNodeB and LMU, over LPPa between LMU and positioning node, over X2 between two eNodeBs, and over a proprietary or standardized interface between eNodeB and OSS.

The coordinating node is in one embodiment an E-SMLC of an LTE system, and the LPPa interface between eNodeBs and the E-SMLC is used to signal the timing information. An advantage of this embodiment is that the E-SMLC may react quickly on a timing problem in the eNodeBs. Furthermore, LPPa is a standardized interface which is an advantage especially in multi-vendor networks. However, the E-SMLC must communicate with many eNodeBs to be able to aggregate the timing information.

In an alternative embodiment, the coordinating node is an OSS connected to each eNodeB. In this case the interfaces between eNodeB and OSS are used for transmitting/receiving the eNodeB timing information, and the interface between OSS and E-SMLC is used by the E-SMLC to retrieve the timing characteristics and the indicators. The advantage of this embodiment is that the E-SMLC only needs to communicate with a single coordinating node to get the timing characteristics, although it may be difficult for the OSS to deliver the information in real-time. Furthermore, the interfaces between the network nodes and the OSS are not fully standardized which may be a drawback in a multi-vendor network.

Hereinafter, the embodiments will be described in relation to an LTE system, where the LPPa interfaces between the eNodeBs and the E-SMLC are used. The coordinating node is thus the E-SMLC.

Figure 4A:
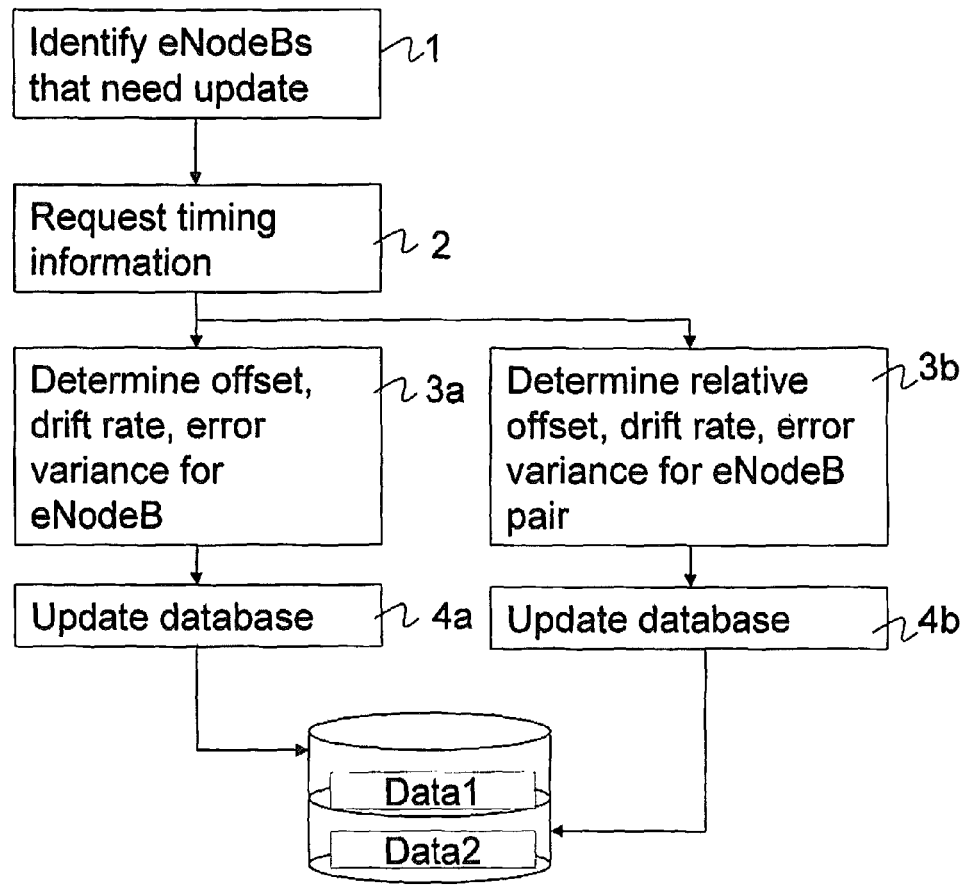
FIG. 4a is a flowchart illustrating the method in the coordinating node according to some embodiments.

In the following, the method of obtaining and dynamically maintaining the eNodeB timing characteristics and relative timing characteristics is described with reference to FIG. 4a. In step 1, the E-SMLC identifies the eNodeBs whose timing characteristics need to be updated according to one embodiment. A possible criterion for the identification of an eNodeB is that the update interval of the eNodeB timing characteristic is longer than an update interval. The update interval may be pre-defined or calculated. An eNodeB with a high drift rate may e.g. have a shorter calculated update interval than another eNodeB with a small drift rate, in order for the timing characteristics to be updated more often when the drift rate is higher.

In step 2, the E-SMLC requests timing information from the eNodeBs identified in step 1, or alternatively from all eNodeBs if step 1 is not performed. In LTE, the request may be transmitted by means of the LPPa protocol over the eNodeB-E-SMLC interface. If the coordinating node is the OSS, the request is sent over the proprietary eNodeB-OSS interface instead. According to 3GPP technical specifications, the timing information in a response from eNodeB may be the SFN Initialization Time, which is an absolute timing information. The SFN Initialization Time is defined as a string of 64 bits, where the time is given in seconds relative to 00:00:00 on 1 Jan. 1900. The integer part of the time is in the first 32 bits and the fraction part is in the last 32 bits. The timing information received in response to the request may also be a timing information relative to some timing reference, such as 1 Jan. 2000, a time of the year, a time of the week, or even relative to some reference clock e.g. of an eNodeB.

In step 3a a timing characteristic of each eNodeB is determined based on the received timing information. The determined timing characteristics might be one or more of an offset, a drift rate, and a timing error variance. Given a time series of timing information obtained in step2, i.e. a discrete set of offsets offset(t) from equation [5] above, the unknown parameters offset_init, DR1, DR2 and var(v(t)), where var(v(t)) is the variance of the residual timing error, may be estimated e.g. according to the following two non-limiting approaches:

Curve fitting—with this approach the criterion of Least Square can be applied to reach a simple solution.

Kalman filtering—this approach provides a good estimate based on a minimum variance criterion.

In step 3b a relative timing characteristic, such as a relative offset, drift rate and timing error variance is determined for pairs of eNodeBs, including one reference eNodeB and one eNodeB neighbor to the reference eNodeB. For a certain area of mobile network coverage described in terms of a radius, the eNodeB which is closest to the geographical center of this area may be used as the reference eNodeB when calculating e.g. the relative drift rate. As an example used only for explanation purpose, the radius is chosen to be maximum 300 km.

Figure 4B:
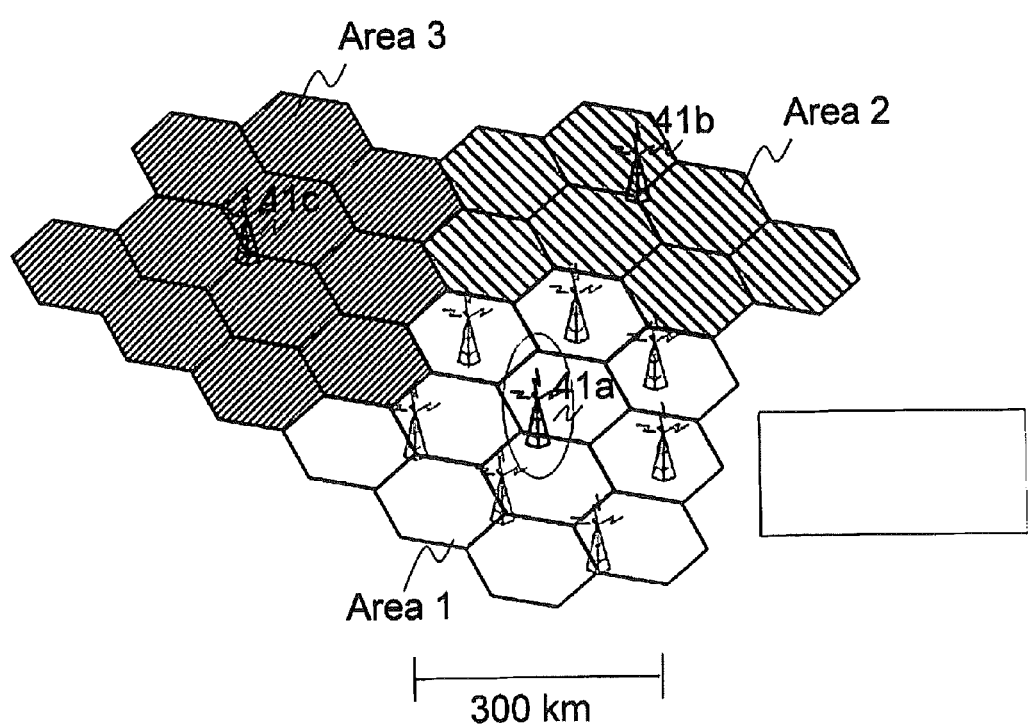
FIG. 4b is a schematic block diagram illustrating the division of the coverage area into sub-areas with one reference/dome eNodeB each.

Areas larger than 300 km may be divided into multiple sub-areas which have each a radius less than 300 km, as e.g. illustrated in FIG. 4b. The limit of 300 km is empirically determined and may depend on the deployment environment and other requirements. The reason for this principle of eNodeB groupings is that for a GPS-based timing service, a timing error is closely related to the following errors:

errors due to ionospheric and tropospheric effects;
ephemeris error; and
GPS satellite clock error.

For GPS receivers which are geographically closely deployed, the above errors and effects are correlated. For two neighbor eNodeBs equipped with GPS receivers as a timing source, the variance of the error e(t) of ΔT given by equation [1] above is smaller than the variance of $T_{BS1}$ or $T_{BS2}$. Since it is the relative timing characteristics of neighbor eNodeBs that is needed for OTDOA positioning, the determination and maintenance of relative timing characteristics is a more precise method to build OTDOA assistance data, although it is less convenient for the E-SMLC. As an examplary embodiment, the big coverage area illustrated in FIG. 4b may be divided into three areas, area 1, area 2 and area 3, with a radius less than 300 km. The black eNodeB in each area, 41a-c, is selected as the respective so called dome eNodeB, and the other eNodeBs are so called local eNodeBs. The E-SMLC then determines and maintains:

$$\Delta Ti = T_{dome} - T_{local,i} \quad [6]$$

where $T_{dome}$ is the absolute timing of the dome eNodeB and $T_{local,i}$ is the absolute timing of the i:th local eNodeB. In order to utilize the geographical correlation property of GPS system errors, $T_{dome}$ and $T_{local,i}$ should be measured simultaneously or at least almost simultaneously. The E-SMLC may therefore in one embodiment send simultaneous requests for timing information to the dome and the local eNodeBs.

In another embodiment, eNodeBs may be grouped according to their native property e.g. according to the eNodeB type. A Home eNodeB, a pico eNodeB, a micro eNodeB, and a macro eNodeB are some examples of eNodeB types. Alternatively, the eNodeBs may be grouped according to their vendor name. The reason for such a grouping is to group eNodeBs with a similar clock stability and accuracy, as eNodeB of different types and vendors may have very different clock accuracy. If eNodeBs in such a grouping are not GPS synchronized, then the grouping makes little sense from an error-reduction point of view. However, the grouping may still be helpful for the E-SMLC to know how frequently the timing characteristics of the eNodeBs or eNodeB pairs should be updated.

In the above described exemplary embodiment, the dome eNodeB is assumed to be a reference eNodeB. However, a simple linear conversion may be applied to get the timing relation of any other eNodeB combinations. For example, based on the following known set of relative timings:

$$\Delta T1 = T_{dome} - T_{local,1}$$
$$\Delta T2 = T_{dome} - T_{local,2}$$
$$\Delta T3 = T_{dome} - T_{local,3}$$
$$\Delta T4 = T_{dome} - T_{local,4} \quad [7]$$

the following timing differences may e.g. also be derived:

$$T_{local,2} - T_{local,1} = \Delta T1 - \Delta T2$$
$$T_{local,2} - T_{local,3} = \Delta T3 - \Delta T2$$
$$T_{local,2} - T_{local,4} = \Delta T4 - \Delta T2 \quad [8]$$

and these latter timing differences may be used e.g. when determining the search window for OTDOA measurements when the local,2 eNodeB is selected as the reference eNodeB.

The same approaches as used in step 3a to determine the timing offset, drift rate, error variance may be applied also to $\Delta T_i$ to get the relative timing offset, relative drift rate and relative residual error variance.

In steps 4a and 4b, the E-SMLC updates the database with the newly determined timing characteristics for each eNodeB and the relative timing characteristics for each eNodeB pair respectively. The database which may be an external database or a database internal to the E-SMLC, includes two categories of data:

A first data category (Data1), which includes the absolute timing characteristics, such as the offset, drift rate and/or timing error variance of each eNodeB. This data may e.g. be used to get fine timing assistance, meaning that highly accurate information or data related to a satellite time reference may be provided based on Data1. One example is that the GNSS reference time can be signaled for multiple reference cells to assist the measuring device with an accurate reference timing signaled as a part of gnss-ReferenceTimeForCells information element in GNSS-ReferenceTime. The first data category may also include a GNSSsynch indicator for each eNodeB, as will be further described below.

A second data category (Data2), which includes the relative timing characteristics such as the relative offset, relative drift rate and relative timing error variance of each eNodeB pair. This data may e.g. be used to derive an OTDOA or UTDOA search window. The second data category may also include a bsAlign indicator for each eNodeB, as will be further described below.

A timing stability status of eNodeBs or eNodeB pairs may thus be obtained from Data1 or Data2. Such status information may be utilized to deduce a reasonable update interval or period for each eNodeB or eNodeB pair, which may then be used in step 1 of FIG. 4a when identifying eNodeBs for which the timing characteristics need to be updated.

Figure 4C:
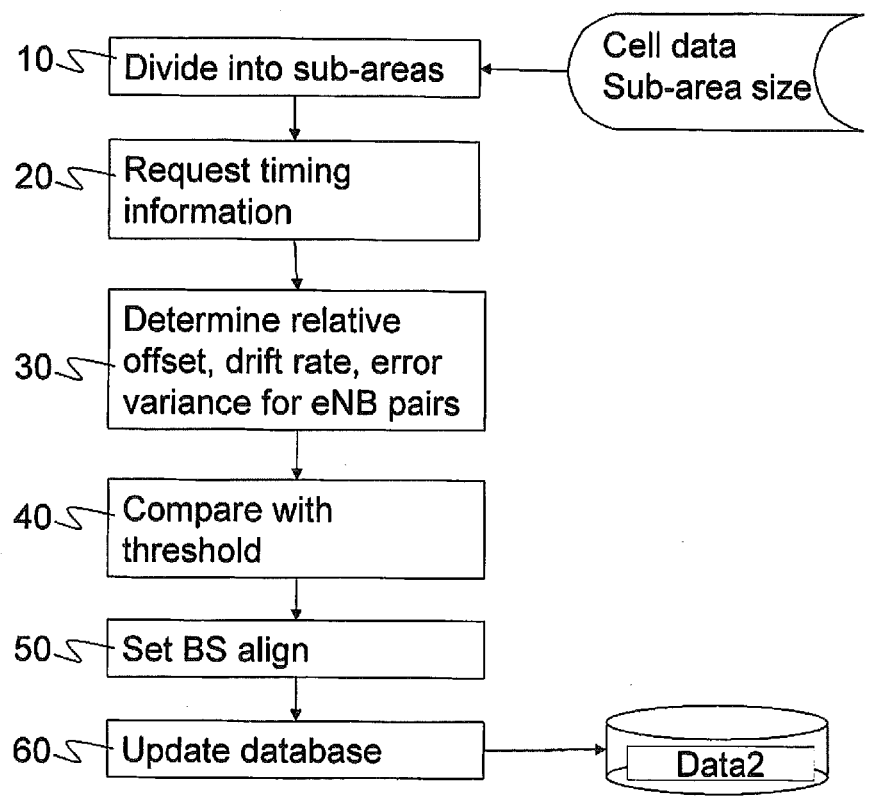
FIG. 4c is a flowchart illustrating the method in the coordinating node according to some embodiments.

According to one embodiment, the relative timing characteristics and the bsAlign indicator may be determined and maintained in the E-SMLC as described hereinafter with reference to FIG. 4c. In step 10, the E-SMLC divides the mobile coverage area into multiple sub-areas. The input data to this step 10 is cell data and a sub-area size limit. A reference or dome eNodeB is chosen for each sub-area, and eNodeB pairs are defined within a sub-area, wherein each pair includes the reference eNodeB of the sub area. In step 20, the E-SMLC simultaneously requests timing information from the eNodeB pairs. Based on the received timing information, the E-SMLC determines the respective relative offset, drift rate and/or error variance of each eNodeB pair in step 30. The determined relative offset may then be compared to a threshold in step 40, the threshold being an upper limit for when the eNodeBs are determined to be aligned. In step 50, the bsAlign indicator which is a Boolean is set to true if the relative offset is below the threshold, and to false otherwise. In step 60, the determined bsAlign indicator is updated in the second data category data 2 of the database, in analogy with the relative timing characteristics update described previously.

A similar principle as the one used for the determining and maintenance of the bsAlign indicator may be applied for the GNSSsynch indicator. The GNSSsynch indicator is determined based on an absolute drift rate of an eNodeB, according to one embodiment. The E-SMLC receives timing information from an eNodeB, either upon request from the E-SMLC or periodically. The E-SMLC determines an absolute drift rate based on the received timing information. If the absolute drift rate is smaller than a pre-defined drift rate threshold, the GNSSsynch indicator is set to zero, thus indicating that there is no frame drift for this eNodeB. The GNSSsynch indicator is then updated in the first data category data1 of the database.

The previous paragraphs have emphasized on the use of timing characteristics and indicators for support when building up assistance data for positioning. The indicators bsAlign and GNSSsynch may e.g. be included in assistance data to the UE to improve not only A-GNSS but also OTDOA measurement quality. The indicators may also be used to create the neighbor cell lists used in assistance data. This will in turn improve a UE measurement quality or shorten a UE measurement time during OTDOA or A-GNSS positioning. However, the dynamically maintained timing characteristics and indicators may also be used to enhance one or more of the following network operations and services:

other positioning methods such as hybrid positioning or UTDOA;

O&M in general, e.g. for maintenance and trouble shooting purposes. The OSS may be informed about eNsB having synchronization problems. The synchronization problems may be indicated e.g. by the bsAlign and GNSS indicators;

tracking area updates;

mobility and handover; and interference coordination and network optimization in general.

Figure 5A:
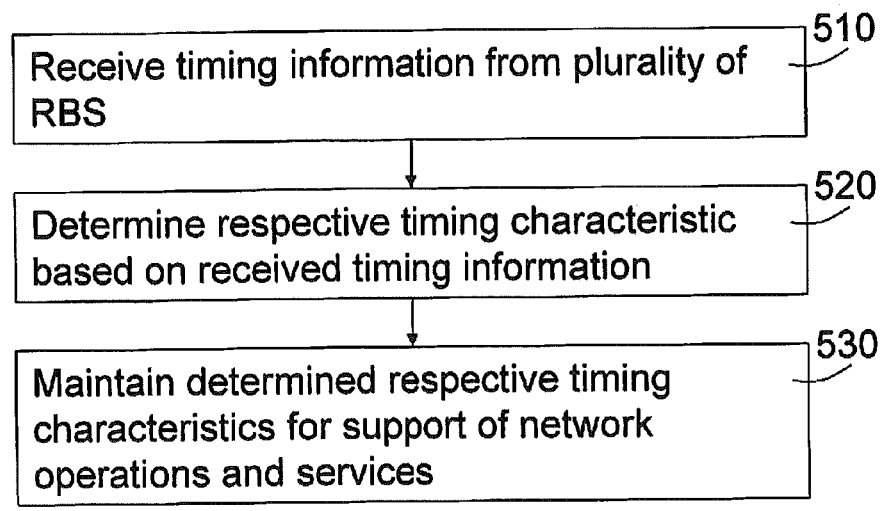
FIGS. 5a-c are flowcharts illustrating the method in the coordinating node according to some embodiments.

FIG. 5a is a flowchart of the method in the coordinating node of a wireless communication system, of maintaining timing characteristics of RBSs connected to the coordinating node, according to an embodiment. The coordinating node may be a positioning node in a user plane or control plane solution, or it may be an OSS. The method includes:

Block 510: Receive timing information from a plurality of RBSs, either periodically or upon request. The timing information may include absolute timing information, or timing information relative to a timing reference.

Block 520: Determine a respective timing characteristic of each of the plurality of RBSs based on the received timing information. The determined respective timing characteristic includes one or more of an offset, a drift rate, and an error variance.

Block 530: Maintain the determined respective timing characteristics for support of network operations and services. Maintaining includes either storing the determined respective timing characteristics in a database, if it is the first time the data appears in the database, or updating the determined respective timing characteristics in the database if a corresponding value is already stored in the database and needs updating. Maintaining may also include removing timing characteristics from the database when they become outdated e.g.

Figure 5B:
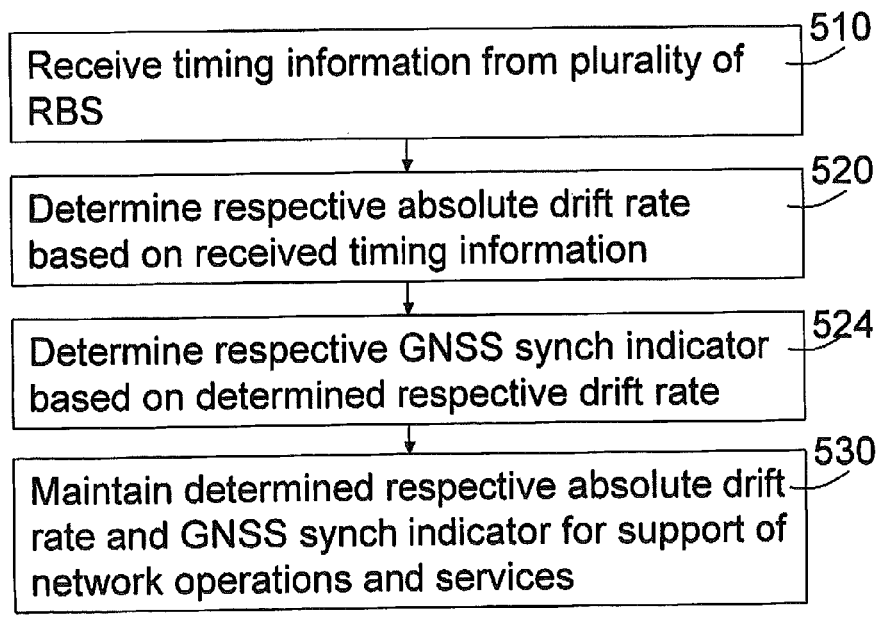

FIG. 5b is a flowchart of the method in the coordinating node according to another embodiment. The method includes:

Block 510: Receive timing information from a plurality of RBSs;

Block 520: Determine a respective absolute drift rate of each of the plurality of RBSs based on the received timing information. In an alternative embodiment, a respective relative drift rate of each of the plurality of RBSs may be determined instead of an absolute drift rate.

Block 524: Determine a respective GNSS indicator of each of the plurality of radio base stations based on the determined respective absolute drift rate. This may e.g. include a comparison of the determined absolute drift rate with a drift rate threshold, and a determination of the GNSS indicator based on the comparison.

Block 530: Maintain the determined respective absolute drift rate and the GNSSsynch indicator for support of network operations and services. The GNSSsynch is mainly used for facilitating and improving A-GNSS, but may also be used for OTDOA positioning. Maintaining includes either storing or updating the determined respective GNSSsynch indicators and absolute drift rates in the database in analogy with the explanation given in step 530 described for FIG. 5a above.

Figure 5C:
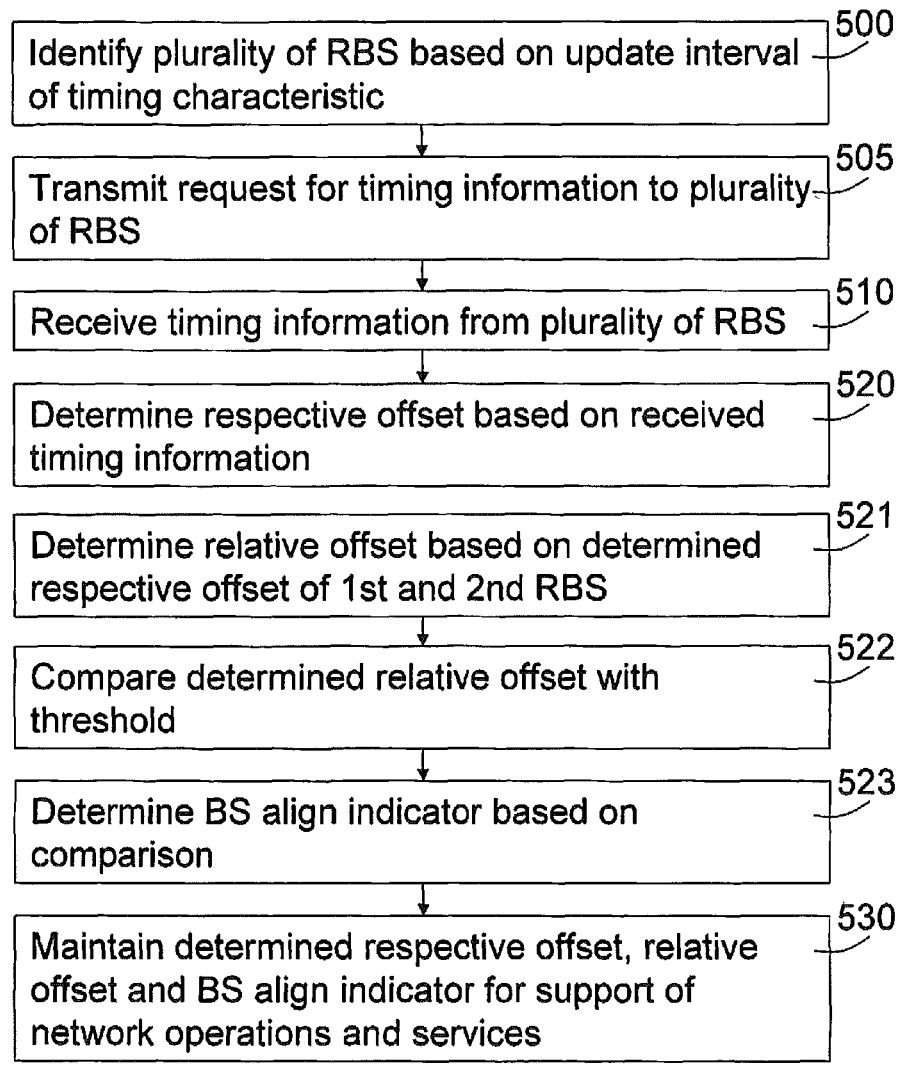

FIG. 5c is a flowchart of the method in the coordinating node according to still another embodiment. In this embodiment, the coordinating node requests the timing information from a group of eNodeBs. The method includes:

Block 500: Identify a plurality of RBSs based on update intervals of the RBSs respective timing characteristics that are stored in the database. The plurality of RBSs may be identified based also on one of the following: a geographical area; an RBS type; and a radio base station vendor.

Block 505: Transmitting a request for timing information to each of the plurality of RBSs, identified in block 500.

Block 510: Receive timing information from the plurality of RBSs.

Block 520: Determine the respective timing characteristics such as the respective offset of each of the plurality of RBSs based on the received timing information.

Block 521: Determine a relative timing characteristic such as the relative offset of a first and second RBS, based on the determined respective timing characteristics of the first and second RBSs.

Block 522: Compare the determined relative offset with a threshold.

Block 523: Determining a bsAlign indicator of the first and second RBSs based on the comparison.

530: Maintain the determined respective timing characteristic, relative timing characteristic of the first and second RBS, and bsAlign indicator for support of network operations and services. Maintaining includes either storing or updating the determined timing characteristic, relative timing characteristic of the first and second RBS, and bsAlign indicator in the database in analogy with the explanation given in block 530 described for FIG. 5a above.

Figure 6:
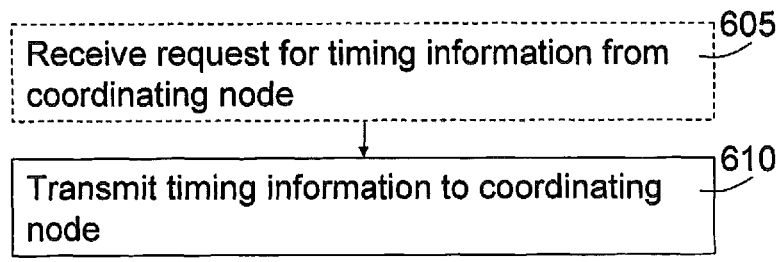
FIG. 6 is a flowchart illustrating the method in the RBS according to some embodiments.

FIG. 6 is a flowchart of the method in the RBS of a wireless communication system, of enabling maintenance of RBS timing characteristics in a coordinating node connected to the RBS, according to an embodiment. The method includes:

Block 605: The optional step of receiving a request for timing information from the coordinating node.

Block 610: Transmitting timing information to the coordinating node, in order for the coordinating node to maintain a timing characteristic, such as one or more of an offset, a drift rate, and an error variance, the timing characteristic being determined based on the timing information. The timing information may be transmitted periodically to the coordinating node, or upon request according to block 605, and may include absolute timing information, or timing information relative to a timing reference.

Figure 7A:
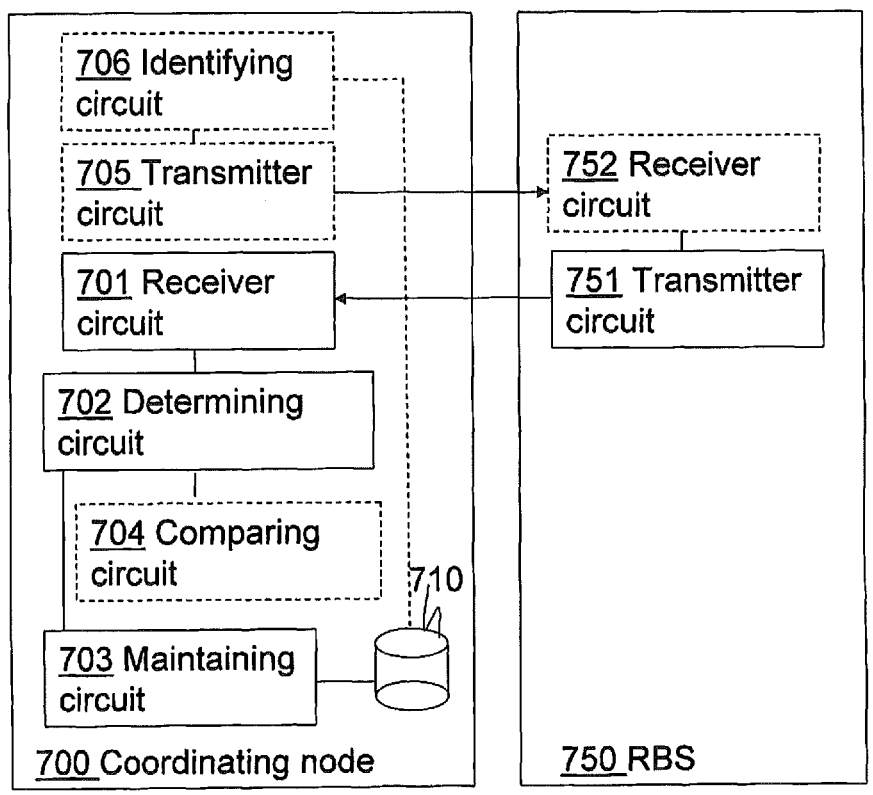
FIGS. 7a-b are schematic block diagrams illustrating schematically a coordinating node and an RBS according to some embodiments.

The coordinating node 700 and the RBS 750 are schematically illustrated in FIG. 7a, according to embodiments of the invention. The coordinating node 700 is configured to be used in a wireless communication system and to maintain timing characteristics of RBSs 750 connectable to the coordinating node 700. The coordinating node 700 may in embodiments be co-located with a positioning node in a control plane or user plane architecture of an LTE network, or with an OSS. The E-SMLC is an example of the positioning node in a control plane solution. The coordinating node 700 includes a receiver circuit 701 for receiving timing information from a plurality of RBSs, and a determining circuit 702 for determining a respective timing characteristic of each of the plurality of RBSs based on the received timing information. The timing information includes absolute timing information, or timing information relative to a timing reference and the timing characteristics includes at least one of an offset, a drift rate, and an error variance. The coordinating node 700 also includes a maintaining circuit 703 for maintaining the determined respective timing characteristics for support of network operations and services. The maintaining circuit 703 may be further adapted to store or update the determined respective timing characteristics in a database 710. In embodiments of the invention, the determining circuit 702 is further adapted to determine a relative timing characteristic of a first and second RBS based on the determined respective timing characteristics of the first and second RBSs. The maintaining circuit 703 is further adapted to maintain also the relative timing characteristic.

In another embodiment, the relative timing characteristic is a relative offset, and the coordinating node further includes a comparing circuit 704 for comparing the determined relative offset with a threshold. The determining circuit 702 is further adapted to determining a bsAlign indicator of the first and second RBSs based on the comparison, and the maintaining circuit 703 is further adapted to maintain also the bsAlign indicator.

In still another embodiment, the determined respective timing characteristic is a respective absolute drift rate, and the determining circuit 702 is further adapted to determine a respective GNSSsynch indicator of each of said plurality of RBSs based on the determined respective absolute drift rate.

In a further embodiment, the coordinating node 700 further includes an identifying circuit 706 for identifying the plurality of RBSs based on an update interval of the respective timing characteristic, and a transmitter circuit 705 for transmitting a request for timing information to each of the identified plurality of RBSs. The identifying circuit 706 is in one embodiment adapted to identify the plurality of RBSs based also on one of the following: a geographical area; an RBS type; and an RBS vendor.

The RBS 750, also illustrated in FIG. 7a, is configured to be used in a wireless communication system and to enable maintenance of RBS timing characteristics in the coordinating node 700 connectable to the RBS. The RBS includes a transmitter circuit 751 for transmitting timing information to the coordinating node 700, in order for the coordinating node to maintain a timing characteristic determined based on the timing information. The timing characteristics may include at least one of an offset, a drift rate, and an error variance. In one embodiment, the RBS 750 further includes a receiver circuit 752 for receiving a request for timing information from the coordinating node before transmitting the timing information. The timing information may include absolute timing information, or timing information relative to a timing reference.

The circuits described above with reference to FIG. 7a are logical circuits and do not necessarily correspond to separate physical circuits.

Figure 7B:
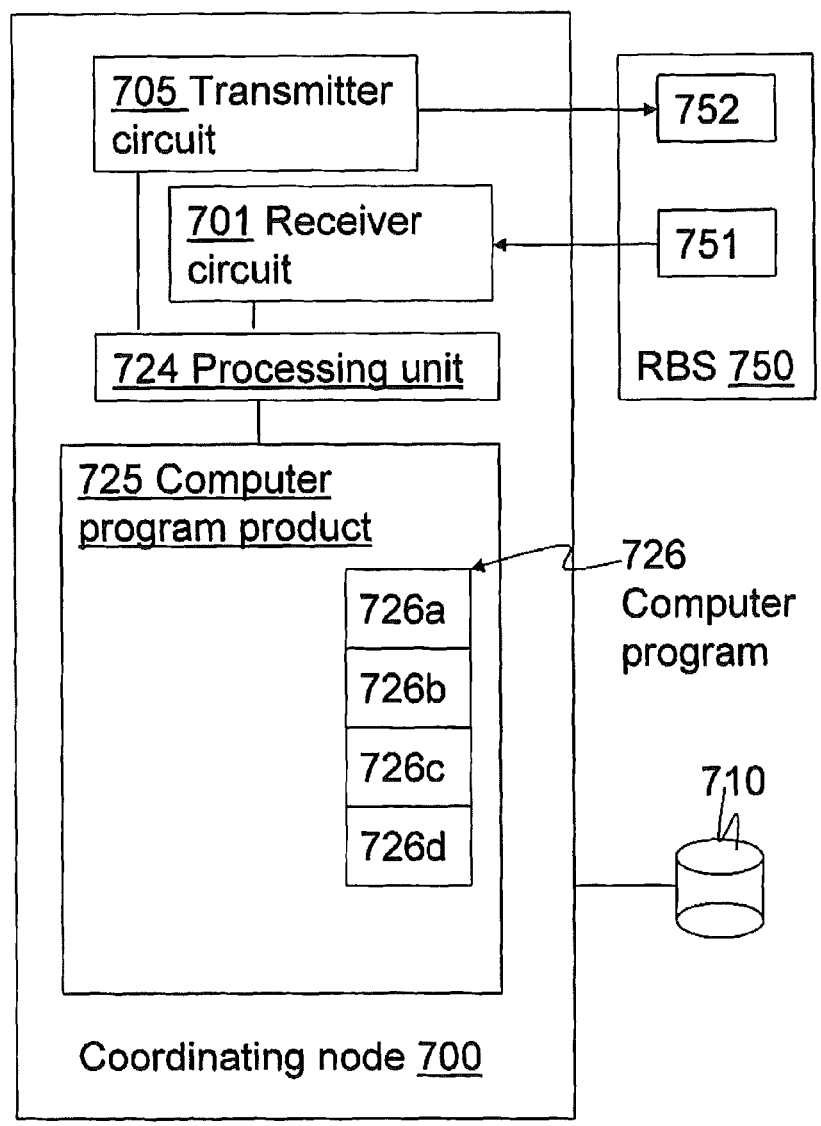

FIG. 7b schematically illustrates an embodiment of the coordinating node 700, which is an alternative way of disclosing the embodiment illustrated in FIG. 7a. The coordinating node 700 includes the receiver circuit 701 and the transmitter circuit 705 already described above, and a processing unit 724 which may be a single unit or a plurality of units. Furthermore, the coordinating node 700 includes at least one computer program product 725 in the form of a non-volatile memory, e.g. an EEPROM (Electrically Erasable Programmable Read-Only Memory), a flash memory or a disk drive. The computer program product 725 includes a computer program 726, which includes code means which when run on the coordinating node 700 causes the processing unit 724 on the coordinating node 700 to perform the steps of the procedures described earlier in conjunction with FIG. 5c.

Hence in the embodiments described, the code means in the computer program 726 of the coordinating node 700 includes an identifying module 726a for identifying the plurality of RBSs, a determining module 726b for determining offsets of the RBSs and relative offsets of pairs of RBSs based on the received timing information, a comparing module 726c for comparing the determined relative offsets with a threshold to allow the determining module 726b to determine the bsAlign indicator based on the comparison, and a maintaining module 726d for maintaining the determined timing characteristics and indicators. The code means may thus be implemented as computer program code structured in computer program modules. The modules 726a-d essentially perform the steps of the flow in FIG. 5c to emulate the coordinating node described in FIG. 7a. In other words, when the different modules 726a-d are run on the processing unit 724, they correspond to the units 702, 703, 704, 706 of FIG. 7a.

Although the code means in the embodiment disclosed above in conjunction with FIG. 7b are implemented as computer program modules which when run on the coordinating node 700 causes the node to perform the steps described above in conjunction with FIG. 5c, one or more of the code means may in alternative embodiments be implemented at least partly as hardware circuits.

The above mentioned and described embodiments are only given as examples and should not be limiting to the present invention. Other solutions, uses, objectives, and functions within the scope of the invention as claimed in the accompanying patent claims may also be possible.

Abbreviations
3GPP 3rd Generation Partnership Program
AECID Adaptive E-CID
A-GPS Assisted GPS
ASN.1 Abstract Syntax Notation One
CID Cell Identity based positioning
E-CID Enhanced CID
eNodeB Evolved Node B
E-SMLC Evolved Serving Mobile Location Center
E-UTRAN Evolved UTRAN
FCC Federal Communications Commission
GNSS Global Navigation Satellite System
GPS Global Positioning System
LMU Location Measurement Unit
LPP LTE Positioning Protocol
LPPa LPP annex
LTE Long Term Evolution
MME Mobility Management Entity
OSS Operations Support System
OTDOA Observed TDOA
RAN Radio Access Network
RBS Radio Base Station
RRM Radio Resource Management
RTD Relative Time Difference
SFN System Frame Number
SLP SUPL Location Platform
SUPL Secure User Plane Location
TA Timing Advance
TDOA Time Difference Of Arrival
UE User Equipment UMTS Universal Mobile Telecommunications System
UTDOA Uplink TDOA
UTRAN Universal Terrestrial RAN

What is claimed is:

1. A method in a coordinating node of a wireless communication system, of maintaining timing characteristics of radio base stations connected to the coordinating node, the method comprising:
   receiving timing information from a plurality of radio base stations;
   determining a respective timing characteristic of each of said plurality of radio base stations based on the received timing information, wherein the determined respective timing characteristic is a respective absolute drift rate;
   maintaining the determined respective timing characteristics for support of network operations and services;
   determining a respective global navigation satellite system synchronization indicator of each of said plurality of radio base stations based on the determined respective absolute drift rate, and
   determining a relative timing characteristic of a first and second radio base station based on the determined respective timing characteristics of the first and second radio base stations, wherein the determined relative timing characteristic is also maintained.

2. The method according to claim 1, wherein maintaining the determined respective timing characteristics comprises storing and/or updating the determined respective timing characteristics in a database.

3. The method according to claim 1, wherein the determined respective timing characteristic comprises at least one of an offset, a drift rate, and/or an error variance.

4. The method according to claim 1, wherein the relative timing characteristic is a relative offset, the method further comprising:
   comparing the determined relative offset with a threshold; and
   determining a base station align indicator of the first and second radio base stations based on the comparison, wherein the base station align indicator is also maintained.

5. The method according to claim 1, wherein the timing information comprises absolute timing information and/or timing information relative to a timing reference.

6. The method according to claim 1, further comprising:
   transmitting a request for timing information to each of said plurality of radio base stations before receiving the timing information.

7. The method according to claim 6, further comprising:
   identifying said plurality of radio base stations to which to transmit the request for timing information based on an update interval of the respective timing characteristic.

8. The method according to claim 7,
   wherein identifying said plurality of radio base stations to which to transmit the request for timing information is further based on a geographical area, a radio base station type, and/or a radio base station vendor.

9. A coordinating node configured to be used in a wireless communication system and to maintain timing characteristics of radio base stations connectable to the coordinating node, the coordinating node comprising:
   a receiver circuit configured to receive timing information from a plurality of radio base stations;
   a determining circuit configured to determine a respective timing characteristic of each of said plurality of radio base stations based on the received timing information, wherein the determined respective timing characteristic comprises a respective absolute drift rate; and
   a maintaining circuit configured to maintain the determined respective timing characteristics for support of network operations and services,
   wherein the determining circuit is further configured to determine a respective global navigation satellite system synchronization indicator of each of said plurality of radio base stations based on the determined respective absolute drift rate,
   wherein the determining circuit is further configured to determine a relative timing characteristic of a first and second radio base station based on the determined respective timing characteristics of the first and second radio base stations, and the maintaining circuit is further configured to maintain also the relative timing characteristic.

10. The coordinating node according to claim 9, wherein the maintaining circuit is further configured to store or update the determined respective timing characteristics in a database.

11. The coordinating node according to claim 9, wherein the determined respective timing characteristic comprises an offset, a drift rate, and/or an error variance.

12. The coordinating node according to claim 9, wherein the relative timing characteristic comprises a relative offset, the coordinating node further comprising:
    a comparing circuit configured to compare the determined relative offset with a threshold;
    wherein the determining circuit is further configured to determine a base station align indicator of the first and second radio base stations based on the comparison, and the maintaining circuit is further configured to maintain also the base station align indicator.

13. The coordinating node according to claim 9, wherein the timing information comprises absolute timing information and/or timing information relative to a timing reference.

14. The coordinating node according to claim 9, further comprising:
    a transmitter circuit configured to transmit a request for timing information to each of said plurality of radio base stations.

15. The coordinating node according to claim 14, further comprising:
    an identifying circuit configured to identify said plurality of radio base stations to which the transmitter circuit transmits the request for timing information based on an update interval of the respective timing characteristic.

16. The coordinating node according to claim 15, wherein the identifying circuit is further configured to identify said plurality of radio base stations based on a geographical area, a radio base station type, and/or a radio base station vendor.

17. The coordinating node according to claim 9, wherein the coordinating node is co-located with a positioning node in a control plane architecture or a user plane architecture, or with an operations support system.

* * * * *